June 30, 1925.                                                              1,543,668
H. GEWECKE
ARRANGEMENT FOR ELIMINATING NOISES IN HIGH FREQUENCY
TELEPHONY THROUGH POWER LINES
Filed April 30, 1923
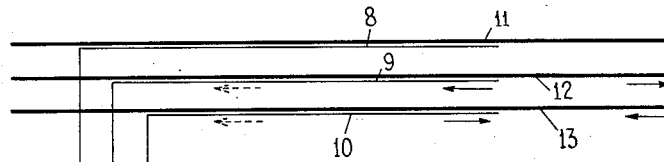
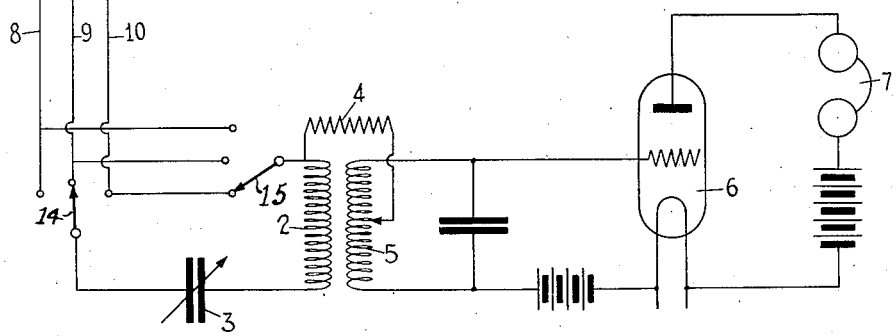
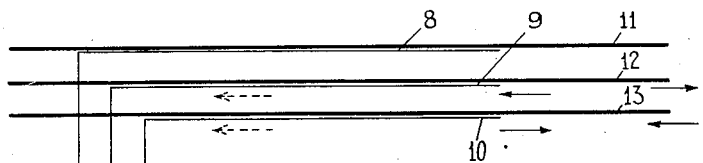
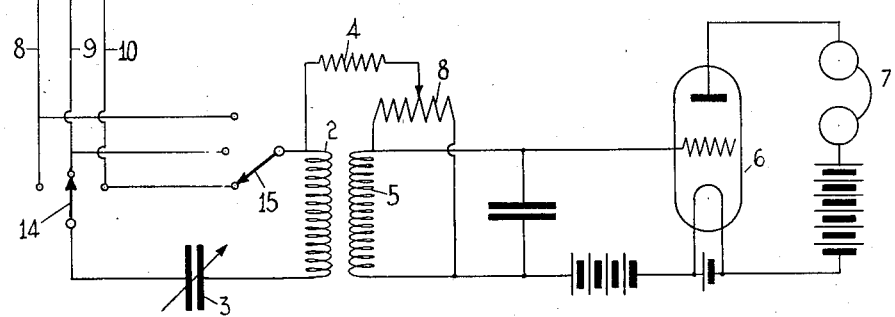
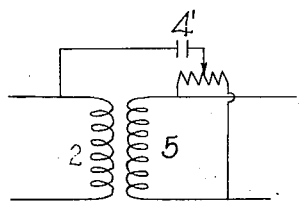
Inventor
HERMANN GEWECKE
By his Attorney Patented June 30, 1925.

1,543,668

UNITED STATES PATENT OFFICE.

HERMANN GEWECKE, OF BERLIN, GERMANY, ASSIGNOR TO GESELLSCHAFT FÜR DRATHLOSE TELEGRAPHIE M. B. H. HALLESCHES, OF BERLIN, GERMANY.

ARRANGEMENT FOR ELIMINATING NOISES IN HIGH-FREQUENCY TELEPHONY THROUGH POWER LINES.

Application filed April 30, 1923. Serial No. 635,584.

*To all whom it may concern:*

Be it known that I, HERMANN GEWECKE, a citizen of Germany, and a resident of Hallesches Ufer 12/13, Berlin, S. W. 11, Germany, have invented new and useful Improvements in Arrangement for Eliminating Noises in High-Frequency Telephony Through Power Lines (for which I have filed an application in Germany, April 22, 1922, No. G 56,394), of which the following is a specification, accompanied by drawings.

Noises in high frequency telephony over power lines may be caused by a flaw in the insulation between one of the three high potential conductors and ground, whereby a slight sparking results. Such noises may to a certain extent be eliminated in the receiver by connecting the receiving circuit to the power lines between the other conductors. Disturbing waves will be produced in the last-named conductors by reason of the flaw in the first conductor. However, the effect of these waves on the magnetic field of the coupling coil of the apparatus may to some extent be eliminated because the disturbing waves have the same phase relation in both conductors whereby the two current waves flow in opposite directions in the coupling coil and will more or less balance each other.

Notwithstanding this, it is impossible entirely to eliminate the noises, and when these noises are very powerful, a material improvement cannot be noticed even when the receiving circuit is connected to the power lines only between the perfect conductors, because in addition to the inductive coupling between the receiver coupling coils there will also be a capacitive coupling. The tension waves which pass from the defective conductor through both of the two conductors or lines with which the coupling coil is connected, even though they have the same phase relation, may cause the passage of a displaced capacitive current from the coupling coil into the coil of the coupled circuit of the receiver whereby the tube of the receiver will be actuated in rhythm with the sparks.

In accordance with the present invention, the capacitive current which cannot be avoided, is forced to flow through a path in which it can have no harmful effects. This may be accomplished by connecting one end of the antenna coupling coil preferably through a predetermined resistance with a point of the coupled circuit of the receiver which is experimentally determined in a manner such as to eliminate the noises in the telephone receiver.

In the drawing,

Fig. 1 is a diagrammatic representation of a circuit arrangement embodying the invention; and Fig. 2 is a diagrammatic representation of a circuit arrangement of modified form.

Fig. 3 is a detail modification showing a modified form of connection between the antenna circuit and the receiver circuit.

The illustrated construction comprises a receiving circuit having a coupling coil 2 and a tuning condenser 3. A resistance 4 is branched off from one end of the coupling coil 2 and is connected with the self-induction coil 5 of the receiving tube 6. In the well known manner a telephone receiver 7 is provided in the anode circuit of the receiving tube 6.

As shown, the receiving circuit comprises elements 8, 9 and 10 having horizontal portions arranged adjacent to and in substantial parallelism with the conductors 11, 12 and 13 respectively of the power transmission line. The lower ends of elements 8, 9 and 10 terminate in contact points of switches 14 and 15 arranged in parallel. The contact arms of switches 14 and 15 are connected in series with coil 2 and condenser 3. Assuming that the conductor 11, is defective so as to cause sparking, the switches 14 and 15 may be arranged as shown in the drawing, that is, with the switches 14 and 15 connected respectively with the elements 9 and 10. The signal current flows in the power conductors 12 and 13 in opposite directions, as indicated by the arrows, and induces a current in opposite directions in the elements 9 and 10, see the full line arrows, thus producing flow of current through the coupling coil 2. The disturbing waves set up in the elements 9 and 10 by sparking from the power conductor 11, however, flow in the same direction in the elements 9 and 10, as indicated by the broken line arrows, and, accordingly, tend to compensate each other in the coupling coil 2 as heretofore explained. However, as also explained above, these disturbing waves are frequently not compensated to an extent sufficient to prevent them from producing harmful effects in the receiver. Under such conditions, this invention enables the disturbing waves to be rendered harmless, it having been found that the point of connection of the resistance 4 to the coil 5 of the receiver can be so adjusted as to eliminate noises in the receiver caused by currents induced by sparking from a defective power line.

Instead of connecting a point of the tuned receiver circuit directly with the receiving circuit, a potential distributor may be provided in parallel with the inductance coil of the receiver circuit. As shown in Fig. 2, the resistance 4 is connected to a resistance 8 provided in parallel with the coil 5.

Instead of using an ohmic resistance in the connection between the antenna and the intermediate circuit, an alternating current resistance e. g. a condenser may be used. This is illustrated in Fig. 3 in which the resistance 4 of the other figures has been replaced by a condenser 4'.

Having described my invention, what I claim is:

1. A circuit arrangement comprising receiving means having a coupling coil, a receiver having a coil coupled with said first coil, an impedance connected to one end of said first mentioned coupling coil, and means whereby said impedance is adjustably connected to said receiver to balance out the effect on the receiver of the capacity effect between said coils.

2. In combination, a power transmission line, a circuit coupled to said line, and including a coupling coil, a receiver including a second coupling coil, said coupling coils being inductively related but electrically insulated, an impedance connected to one side of said first coil and means for adjustably connecting said impedance to said receiver to balance out the effect on the receiver due to capacity between said coils.

3. In combination, a power transmission line comprising a plurality of conductors, there being disturbing oscillations induced in one of said conductors, a circuit coupled to two other of said conductors and including a coupling coil, a receiving circuit including a second coupling coil, said coupling coils being inductively related but electrically insulated, an impedance connected to one side of said first coil and means for adjustably connecting said impedance to said receiving circuit to balance out the effect on said receiving circuit due to capacity between said coils.

4. In combination, a power transmission line comprising a plurality of conductors, there being disturbing oscillations induced in one of said conductors, a circuit coupled to two other of said conductors and including a coupling coil, a receiving circuit including a second coupling coil, said coupling coils being inductively related but electrically insulated, an impedance connected across said second coupling coil, and a second impedance connected to one side of said first coil and also to an adjustable position on said first impedance to balance out the effect on said receiving circuit due to capacity between said coils.

5. In combination, a power transmission line, a receiving circuit coupled to said line, a receiver, means for coupling said receiving circuit to said receiver so that said receiving circuit is insulated from said receiver and means extending from said receiving circuit to said receiver for balancing the effect of disturbing capacity currents flowing from said receiving circuit to said receiver on said receiver.

Dr. HERMANN GEWECKE.